United States Patent
Murray et al.

(10) Patent No.: US 12,052,222 B2
(45) Date of Patent: *Jul. 30, 2024

(54) LOCALLY REPRESENTING A REMOTE APPLICATION PROGRAMMING INTERFACE (API) ENDPOINT WITHIN AN APPLICATION PLATFORM

(71) Applicant: Hewlett Packard Enterprise Development LP, Houston, TX (US)

(72) Inventors: Paul Murray, Bristol (GB); Nicholas Randon, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 399 days.

This patent is subject to a terminal disclaimer.

(21) Appl. No.: 17/451,106

(22) Filed: Oct. 15, 2021

(65) Prior Publication Data

US 2022/0038434 A1 Feb. 3, 2022

Related U.S. Application Data

(63) Continuation of application No. 16/776,735, filed on Jan. 30, 2020, now Pat. No. 11,153,279.

(51) Int. Cl.
 *H04L 67/10* (2022.01)
 *H04L 9/40* (2022.01)
 (Continued)

(52) U.S. Cl.
 CPC ...... *H04L 63/0281* (2013.01); *H04L 41/0806* (2013.01); *H04L 61/4511* (2022.05);
 (Continued)

(58) Field of Classification Search
 CPC ............ H04L 63/0281; H04L 41/0806; H04L 61/4511; H04L 61/5007; H04L 63/029; H04L 67/10; H04L 63/0272
 (Continued)

(56) References Cited

U.S. PATENT DOCUMENTS

| 9,077,773 B2 * | 7/2015 | Marietti | .................... G06F 8/30 |
| 2013/0283270 A1 * | 10/2013 | Holland | .................... H04L 9/40 |
| | | | 718/1 |

(Continued)

FOREIGN PATENT DOCUMENTS

| CN | 108810013 A | 11/2018 |
| CN | 108964968 A | 12/2018 |

OTHER PUBLICATIONS

Akamai, "Enterprise Application Access", Akamai Cloud security solutions: product brief, Jan. 2020, 6 pages.

(Continued)

*Primary Examiner* — Kaylee J Huang
(74) *Attorney, Agent, or Firm* — Trop, Pruner & Hu, P.C.

(57) ABSTRACT

Example implementations relate to exposing on-premise API endpoints in a cloud-based application platform. The application platform receives information regarding a forwarding proxy associated with a private network and information regarding a remote application programming interface (API) endpoint within the private network. A mapping between a resource model of the application platform to a tunnel established between a forwarding client of the application platform and the forwarding proxy is created by a controller of the application platform causing the forwarding client to instantiate a port corresponding to a forwarding route for the remote API endpoint based on the information regarding the forwarding proxy and the remote API endpoint. The remote API endpoint is locally represented within the application platform in a form of an instance of a service abstraction provided by the application platform.

20 Claims, 7 Drawing Sheets

(51) Int. Cl.
*H04L 41/0806* (2022.01)
*H04L 61/4511* (2022.01)
*H04L 61/5007* (2022.01)

(52) U.S. Cl.
CPC ............ *H04L 63/029* (2013.01); *H04L 67/10* (2013.01); *H04L 61/5007* (2022.05); *H04L 63/0272* (2013.01)

(58) Field of Classification Search
USPC .................... 726/12; 709/201, 203, 219, 245
See application file for complete search history.

(56) References Cited

U.S. PATENT DOCUMENTS

| | | | | |
|---|---|---|---|---|
| 2013/0347072 | A1* | 12/2013 | Dinha | ...................... H04L 67/56 709/227 |
| 2015/0372982 | A1* | 12/2015 | Herle | .................. H04L 63/0272 726/15 |
| 2016/0366233 | A1 | 12/2016 | Le et al. | |
| 2019/0109729 | A1* | 4/2019 | De Luca | ................. H04L 45/17 |
| 2020/0126513 | A1* | 4/2020 | Lau | ........................... G09G 5/14 |
| 2021/0058445 | A1* | 2/2021 | Choi | ..................... H04L 67/563 |

OTHER PUBLICATIONS

HPE, "HPE Remote Device Access", Security Whitepaper, Jun. 2018, pp. 1-24.
IBM cloud, "About Secure Gateway", IBM Cloud Docs, available online at <https://cloud.ibm.com/docs/services/SecureGateway?topic=securegateway-about-sg>, May 28, 2019, 3 pages.
Kyle Brown et al., "Accessing your on-premises data from microservices running on IBM Blumix,", IBM Bluemix., 2019, pp. 1-14.
Song et al., "An Auto Scaling System for API Gateway Based on Kubernetes", IEEE, 2018, pp. 109-112.

* cited by examiner

LOCALLY REPRESENTING A REMOTE APPLICATION PROGRAMMING INTERFACE (API) ENDPOINT WITHIN AN APPLICATION PLATFORM

BACKGROUND

Hybrid cloud portals seek to offer a seamless experience across public and private clouds and on-premise environments to, among other things, provide customers with flexibility in terms of where resources (e.g., Information Technology (IT) infrastructure resources and services) reside. For a variety of reasons, customers of cloud portals may have a need to integrate external resources or services of a private network (which at times may be referred to herein individually as a remote customer service, a customer service, an external service or simply a service) with an application running in an application platform of a public cloud. For example, a cloud-based application platform may be used to monitor and/or configure Information Technology (IT) infrastructure resources distributed across public clouds and on-premise environments.

On-premise environments, such as customer data centers, typically use private networks that are isolated from the Internet by firewalls and may use private addressing and name servers internally. As such, interactions with resources within on-premise environments by an application running within a cloud-based application platform cannot be performed by the cloud portals without the ability to traverse the firewalls and use the private addressing and naming.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
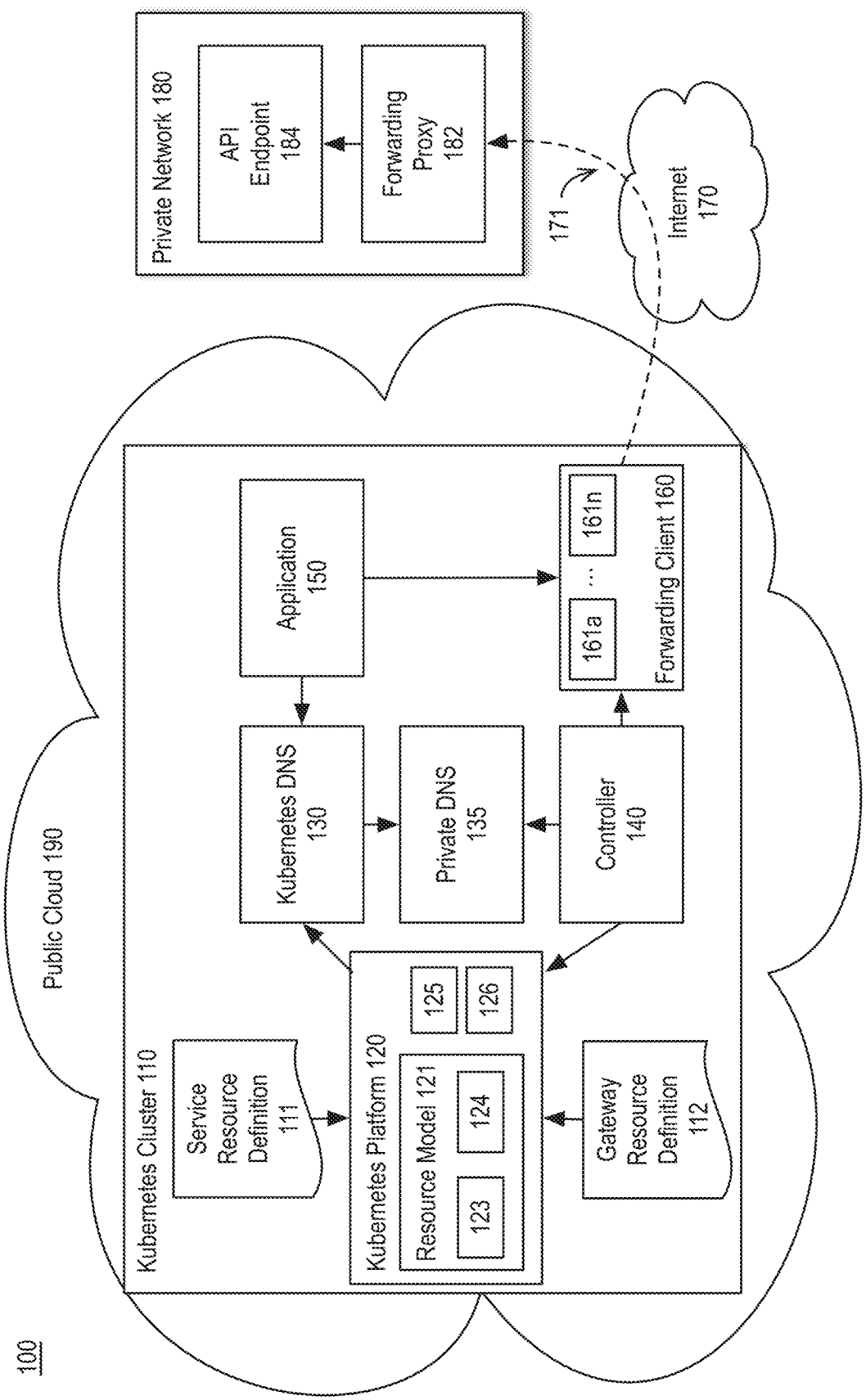
FIG. 1 is a block diagram conceptually illustrating various components of a system in accordance with an embodiment.

Embodiments described herein are generally directed to exposing on-premise API endpoints in a cloud-based application platform. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

Embodiments described herein provide a mechanism to expose on-premise API endpoints to an application or service running within a cloud-based application platform in a way that allows the application or service to access the remote API endpoints as if they (the remote API endpoints) were local endpoints within the application platform. A non-limiting example of a scenario in which it may be helpful to facilitate transparent access by an application to a remote API endpoint as if it were a local API endpoint involves management by the application of resources across public clouds and on-premise environments. For example, a customer of the hybrid cloud portal may desire an application running within a container cluster to be able to manage IT infrastructure resources within one or more other public clouds as well as those residing on-premise. In order to manage the remote IT infrastructure, the container cluster should be able to traverse an intervening firewall to allow it to interact with a management system associated with the IT infrastructure resources, for example. Additionally in the context of this container cluster example, the mechanism should also support internal naming, addressing and RBAC controls of the cluster. Similarly, the mechanism should handle the mapping from cluster internal naming to remote communication with the API endpoints and support server authentication.

According to one embodiment, a system is deployed in a container cluster that creates and manages connectivity to API endpoints residing in a remote private infrastructure. The API endpoints are presented in the cluster in the form of instances of a service abstraction (e.g., service resources) that can be resolved via the local DNS. In this manner and as explained in further detail below, the system enables software running in containers in the cluster to access the remote API endpoints as if they were local API endpoints inside the cluster.

While for sake of brevity and for purposes of providing concrete examples, in the context of various embodiments described herein, the hybrid cloud portal is described with reference to a specific container platform (i.e., a Kubernetes cluster), those skilled in the art will appreciate the methodologies herein are equally applicable to other application platforms that implement service and endpoint abstractions similar to those provided by Kubernetes.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrase "application platform" generally refers to a platform for automating deployment, scaling, and execution of virtualized applications. Virtualized applications may include containerized applications or applications that run in a virtual machine environment. As such non-limiting examples of an application platform include both container platforms (e.g., Kubernetes, Docker swarm, and the Amazon EC2 Container Service (ECS) and native or hosted virtual machine monitor (VMM) or hypervisor environments (e.g., VMware, Kernel-based Virtual Machine (KVM), Amazon Web Services (AWS), and the like).

The phrase "resource model" generally refers to the mechanism by which an application platform models or otherwise represents resources. In the context of Kubernetes, non-limiting examples of resources include infrastructure resources, such as memory (e.g., random access memory (RAM)), central processing unit (CPU, disk-time, and network bandwidth, and API resources, such as Pods, Services, and Endpoints.

The phrase "service abstraction" generally refers a mechanism that can be used to define a service within an application platform. For example, the mechanism may be a schema/resource type or a class. A non-limiting example of a service abstraction is a Kubernetes service, an instance of which represents an abstraction that defines a logical set of Pods and a policy by which to access them.

The phrase "endpoint abstraction" generally refers a mechanism that can be used to define and track network endpoints within an application platform. For example, endpoints can be used to track the IP addresses of the objects to which a service sends traffic. A non-limiting example of an endpoint abstraction is Kubernetes endpoints, an instance of which can be used to track the IP addresses of the objects to which a service sends traffic.

The term "tunnel" generally refers to a network communication channel between two networks. For example, tunneling may involve allowing private network communications to be sent across a public network, such as the Internet, through a process called encapsulation. Depending upon the particular implementation, the encapsulated content may be encrypted or unencrypted. In order for a connection to be established between the two networks, the endpoints within the two networks use the same communication protocol (called a tunneling protocol) that encloses in its datagram another complete data packet that uses a different communication protocol. In this manner, the two endpoints create what is referred to as a "tunnel" between two points in a network that can securely transmit any kind of data between them. Generally, tunneling protocols are used to send private network data over a public network, usually when creating a virtual private network (VPN), but they can also be used to increase the security of unencrypted data when the data is sent over a public network. There are a number of popular tunneling protocols, including, but not limited to, Secure Socket (SSH), Point-to-Point Tunneling (PPTP) and Internet Protocol Secure (IPsec), with each being tailored for a different tunneling purpose.

FIG. 1 is a block diagram conceptually illustrating various components of a system 100 in accordance with an embodiment. In the context of the present example, the system 100 includes an application platform (e.g., Kubernetes cluster 110) operating within a public cloud 190 and coupled in communication with a private network 180 through the Internet 170 via a tunnel 171.

As described in further detail below, in this example, system 100 provides a mechanism deployed in a standard Kubernetes cluster 110 that creates and manages connectivity to remote API endpoints (e.g., API endpoint 184) residing in remote private infrastructure (e.g., private network 180).

In one embodiment, the API endpoint 184 is represented in the Kubernetes cluster 110 as an instance of a service abstraction (e.g., service resource object 125) having an associated instance of an endpoint abstraction (e.g., endpoints resource object 126) that can be resolved via local DNS mechanisms (e.g., Kubernetes DNS 130 and private DNS 135). In this manner, software (e.g., application 150) running in containers in the Kubernetes cluster 110 are able to access remote API endpoints (e.g., API endpoint 184) as if they were local inside the Kubernetes cluster 110.

In the context of the present example, it is assumed a network communication mechanism (e.g., a remote connectivity solution) is available that can establish network tunnels (e.g., tunnel 171) through an intermediate public network (e.g., Internet 170) between two forwarding components, one (e.g., forwarding proxy 182) running in the private network 180, in order to traverse a firewall (not shown) into the private network 180 and the other (e.g., forwarding client 160) running in the application platform (e.g., Kubernetes cluster 110). Non-limiting examples of such a remote connectivity solution include HPE Remote Device Access, Akamai Enterprise Application Access, and IBM Secure Gateway Service.

Turning now to the Kubernetes cluster 110, the cluster 110 includes a Kubernetes platform 120, a Kubernetes DNS 130 (e.g., generally representing a DNS server that serves DNS records for Kubernetes services), a private DNS zone 135, a controller 140, an application 150 and a forwarding client 160.

According to one embodiment, responsive to a request, the forwarding client 150 can create a network route via the tunnel 171 with the forwarding proxy 182 to an address in the private network 180. In the context of the present example, the forwarding client 160 is provided with information regarding the identity of the forwarding proxy 182 and the address of the API endpoint 184 in the addressing scheme of the private network 180 by the controller 140 as described further below with reference to FIGS. 5A-B.

In the context of the present example, the forwarding client 160 may be packaged in a container (not shown) and will create a port (e.g., one of ports 161a-n) on the container that corresponds to the forwarding path to the API endpoint 184. In this manner, a container (e.g., one which application 150 runs) in the Kubernetes cluster 110 can communicate with the API endpoint 180 by directing network traffic to the appropriate port (e.g., ports 161a-n) of the forwarding client 160.

The Kubernetes platform 120 includes a resource model 121 that provides standard resource definitions (e.g., a service abstraction 123 and an endpoint abstraction 124) and a custom resource definition extension mechanism that can be used to extend the resource model 121 to include custom resources and/or services. In one embodiment, this custom resource definition extension mechanism is used to define customer resources and/or services (e.g., service resource definition 111 and gateway resource definition 112).

In the context of the present example, the service resource definition 111 provides information regarding a collection of API endpoints (e.g., API endpoint 184 and/or others). As discussed further below, the service resource definition 111 may include a reference to the gateway (e.g., forwarding proxy 182) that is to be used for the remote customer service at issue (e.g., a remote management system or other service accessed via API endpoint 184), as well as the address and protocol of each API endpoint using the addressing scheme of the private network 180 and a name for each endpoint. In one embodiment, a local service (corresponding to the remote customer service) is deployed into a namespace in the Kubernetes cluster 110 and is therefore covered by RBAC controls associated with namespaces.

Figure 3:
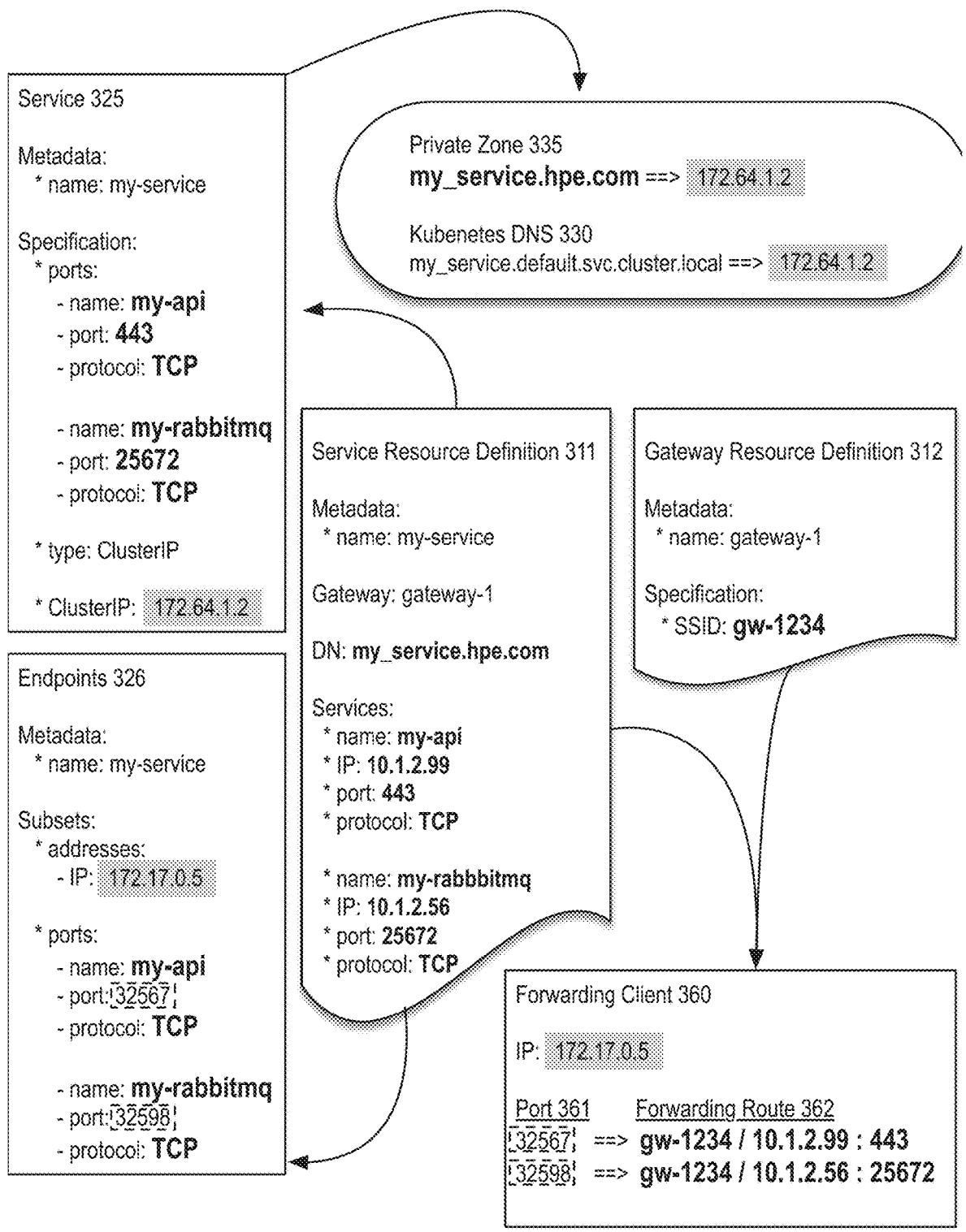
FIG. 3 is a block diagram illustrating a data mapping among components when using a service with a cluster Internet Protocol (IP) address in accordance with an embodiment.
Figure 4:
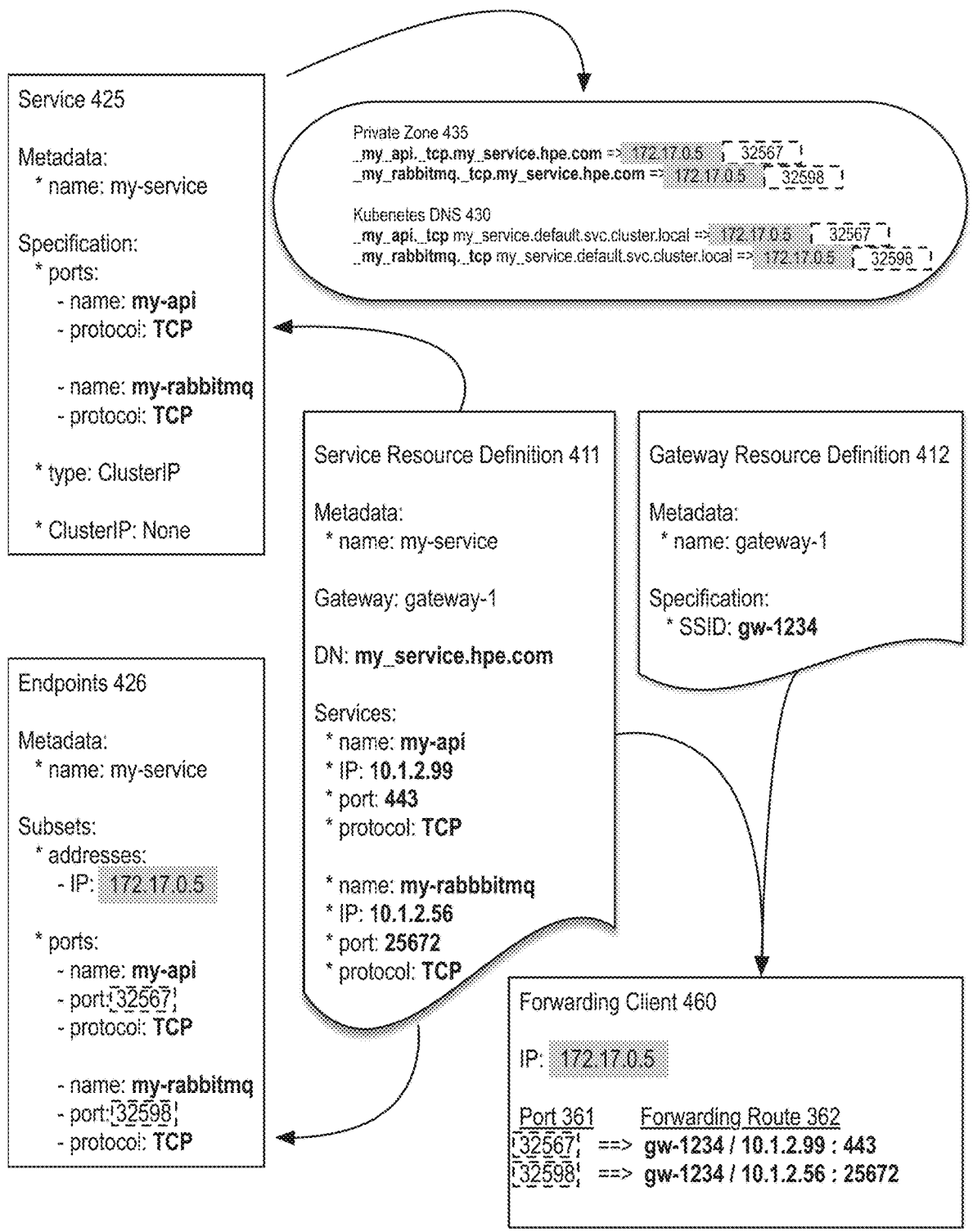
FIG. 4 is a block diagram illustrating an alternative data mapping among components when using a headless service in accordance with an embodiment.

The gateway resource definition 112 provides information that is used to identify and locate the forwarding proxy 182. As illustrated in FIGS. 3 and 4, the gateway resource definition 112, may include a universal unique identifier (UUID) used by the tunnel mechanism (e.g., a service station identifier (SSID) used by HPE Remote Device Access). While for sake of brevity, only a single forwarding proxy 182 is described in the context of the present example, in various embodiments, multiple forwarding proxies can be in use in at any time in a single private network (e.g., private network 180) or in multiple private networks. Similarly, while only one customer gateway resource definition 112 is described in the context of the present example, when multiple forwarding proxies are in use, multiple customer gateway resource definitions can be deployed in the Kubernetes cluster 110 to represent them. Further details regarding the service resource definition 111 and the gateway resource definition 112 are provided below with reference to FIGS. 3 and 4.

According to one embodiment, the controller 140 implements a mapping from the service resource definition 111 and the gateway resource definition 112 to a configuration of the forwarding client 160, a configuration of the Kubernetes platform 120 and a configuration of the private DNS zone 135. In various embodiments described herein, this mapping is maintained autonomously and abstracts the remote nature of the remote API endpoints defined by the service resource definition 111 from applications (e.g., application 150) running in the Kubernetes cluster 110 that use them. A non-limiting example of a data mapping (and an alternative data mapping) among the configured components is described with reference to FIG. 3 and FIG. 4, respectively.

Figure 2:
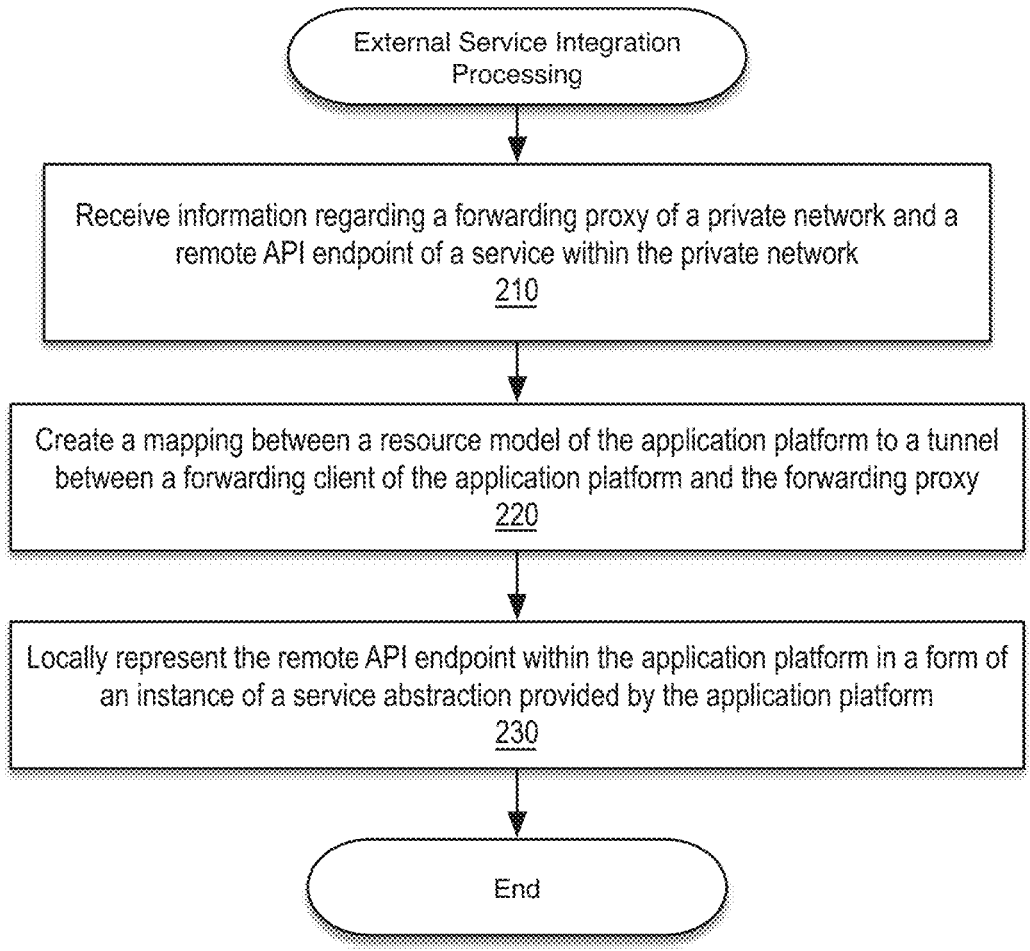
FIG. 2 is a flow diagram illustrating external service integration processing in accordance with an embodiment.

FIG. 2 is a flow diagram illustrating external service integration processing in accordance with an embodiment. The processing described with reference to FIG. 2 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system described with reference to FIG. 6 below.

At block 210, information is received by the application platform regarding a forwarding proxy of a private network and a remote API endpoint of a customer service within the private network that is to be represented locally within the application platform. According to one embodiment, the information regarding the forwarding proxy (e.g., forwarding proxy 182) is received in the form of a gateway resource definition (e.g., gateway resource definition 112). For example, the gateway resource definition may be a custom resource that extends the Kubernetes API and that is provided in the form of a configuration file using YAML Ain't Markup Language (YAML) or an object notation (e.g., JavaScript Object Notation (JSON)).

According to one embodiment, the information regarding the remote API endpoint (e.g., API endpoint 184), is received in the form a service resource definition (e.g., service resource definition 111). For example, the service resource definition may be a custom resource that extends the Kubernetes API and that is provided in the form of a configuration file using YAML Ain't Markup Language (YAML) or an object notation (e.g., JavaScript Object Notation (JSON)).

At block 220, a mapping is created between a resource model of the application platform to a tunnel between a forwarding client of the application platform and the forwarding proxy. According to one embodiment, a controller (e.g., controller 140) creates the mapping by causing the forwarding client (e.g., forwarding client 160) to instantiate a port (e.g., one of ports 161a-n) corresponding to a forwarding route for the remote API endpoint (e.g., API endpoint 184) based on the information regarding the forwarding proxy and the remote API endpoint received in block 210.

In various embodiments described herein, each remote customer service is related to a customer gateway (e.g., forwarding proxy 182). In one embodiment, a forwarding agent (e.g., forwarding client 160) is configured with a forwarding route for each API endpoint associated with the remote customer service, for example, as specified by the service resource definition 111. Additionally, the forwarding proxy identified, for example, via the gateway resource definition 112 may be used in the configuration of the forwarding route. In some examples, the IP address, port and protocol of the forwarding route are those listed in the service resource definition.

Once configured, in one embodiment, the forwarding client instantiates a port that corresponds to each forwarding route. This port and the IP address of the forwarding agent are used in the data mappings described below with reference to FIG. 3 and FIG. 4.

At block 230, the remote API endpoint is locally represented within the application platform in a form of an instance of a service abstraction (e.g., service resource object 125) provided by the application platform. According to one embodiment, the controller configures an instance of an endpoint abstraction (e.g., an endpoints resource object 126) provided by the application platform that maps a name and port of the remote API endpoint to an address and the port of the forwarding client and configures endpoint attributes of the instance of the service abstraction with a protocol of the API endpoint and a reference to the instance of the endpoint abstraction.

FIG. 3 is a block diagram illustrating a data mapping among components when using a service with a cluster Internet Protocol (IP) address in accordance with an embodiment. According to one embodiment, the controller maps the resource model of the application platform to the service resource configuration.

The Kubernetes community recommends the use of a service resource without a pod selector as a means to integrate external services, for example, by adding an endpoints resource that directs the internal load balancer directly to an external address from inside a Kubernetes cluster. Embodiments described herein differ from this recommended pattern at least in that the controller automatically configures the endpoints resource (e.g., endpoints 326) in coordination with the creation of forwarding paths in the forwarding client. According to one embodiment, the configuration of the endpoints 326 is a combination of data that is provided by the user (e.g., specification of the API endpoints by supplying a service resource definition 311 in the form of a file or by manually entering the information via a graphical user interface associated with the application platform), automatically created by the forwarding client (forwarding path ports 361) and automatically generated by Kubernetes (forwarding client pod IP and cluster IP). The optional inclusion of private zones (e.g., private zone 335) to support server authentication, the customer service and customer gateway models, the mapping of the models to the various configuration components and the process for implementing and maintaining the mapping are also unique.

In the context of the present example, for purposes of identifying the sources of various information, the information provided by the user (e.g., relating to the customer service API endpoints and the gateway) is presented in bold text; the information automatically created by the forwarding client (e.g., forwarding client 360) is included in boxes with dashed outlines; and the information automatically generated by Kubernetes (e.g., forwarding client pod IP and the cluster IP) are presented with a grey background.

In the context of Kubernetes, a service resource models an internal load balancer that redirects traffic to dynamically changing backend pods. When a service (e.g., service 325) is created, Kubernetes allocates a cluster IP address to the service and create a DNS entry mapping the service name to the cluster IP. The routing configuration for the load balancer is specified by an endpoints resource (e.g., endpoints 326). Kubernetes can automatically configure an endpoints resource to match pods found by the evaluation of a selector specified in the service resource.

The cluster IP allocation and DNS entry mapping that comes with a Kubernetes service are exploited in various embodiments described herein. Kubernetes, however, is unable to determine the load balancer routing because Kubernetes does not know how the forwarding client 360 allocates ports 361, when the ports 361 change or how the ports 361 relate to the service endpoint list (e.g., the collection of remote APIs specified by the service resource definition 111).

In the context of the present example, responsive to receipt of a service resource definition 311 or a gateway resource definition 112 by the application platform, the controller of the application platform configures the service resource 325 with no selector and with endpoints that correspond to the customer service API endpoints' name, port and protocol. The controller also configures the endpoints resource 326 that maps the name (my-api and my-rabbitmq in this example) and port (443 and 25672 in this example) to the forwarding client IP address (172.17.0.5 in this example) and the assigned port 361 (32567 and 32598 in this example) by the forwarding client 360 for the forwarding route 362.

FIG. 4 is a block diagram illustrating an alternative data mapping among components when using a headless service in accordance with an embodiment. As a minor alternative to the data mapping described with reference to FIG. 4, in the context of the present example, the service resource 425 can be configured with NONE as the value of the cluster IP. This will cause Kubernetes to add service DNS entries of the private zone 435 and the Kubernetes DNS 430 that map the API name, protocol and service name directly to the forwarding client IP address and port that the controller has specified in the endpoints resource 426. For example, in one embodiment, if the Cluster IP is NONE, the entries will be of the form that maps the "my_api._tcp . . . " name to the forwarding client IP/port; whereas, if there is a Cluster IP, the DNS entries will be of the form mapping the service name "my_service . . . " to the service Cluster IP.

As an additional extension of the above two examples described with reference to FIG. 3 and FIG. 4, in one embodiment, the resource model can be mapped to the private DNS zone 135. For example, an upstream nameserver can be configured with a private zone for the domain of the private network 180. The Kubernetes DNS 130 is configured to use this zone as an upstream nameserver for the domain. Any name it cannot resolve will be referred to the private zone in the upstream nameserver. In this manner, a means is provided to locally override the domain resolution of the private network 180.

According to one embodiment, the remote customer service as defined in the service resource definition 111, for example, can contain a domain name that is in the domain of the private network 180. When this name is specified, the controller 140 will create a corresponding DNS entry in the private DNS zone of the upstream nameserver. When using a service with a cluster IP, this entry will associate the cluster IP with the name as shown in FIG. 3. If using a headless service, the forwarding client's IP address and the port of the appropriate forwarding route are associated with the name in the DNS entry as shown in FIG. 4.

In this manner, server authentication can be supported. For example, when the local API endpoint presents a server certificate, the server certificate will refer to the original endpoint (e.g., API endpoint 184), not the port on the forwarding client (e.g., forwarding client 160). Therefore, under normal circumstances, server authentication at the application (e.g., application 150) will fail because the authentication is addressing the forwarding client. According to one embodiment, locally overriding the DNS name resolution for the private zone as described herein causes the domain name for the service to resolve to the forwarding client. This allows server authentication to succeed where the server certificate includes the domain name.

Figure 5A:
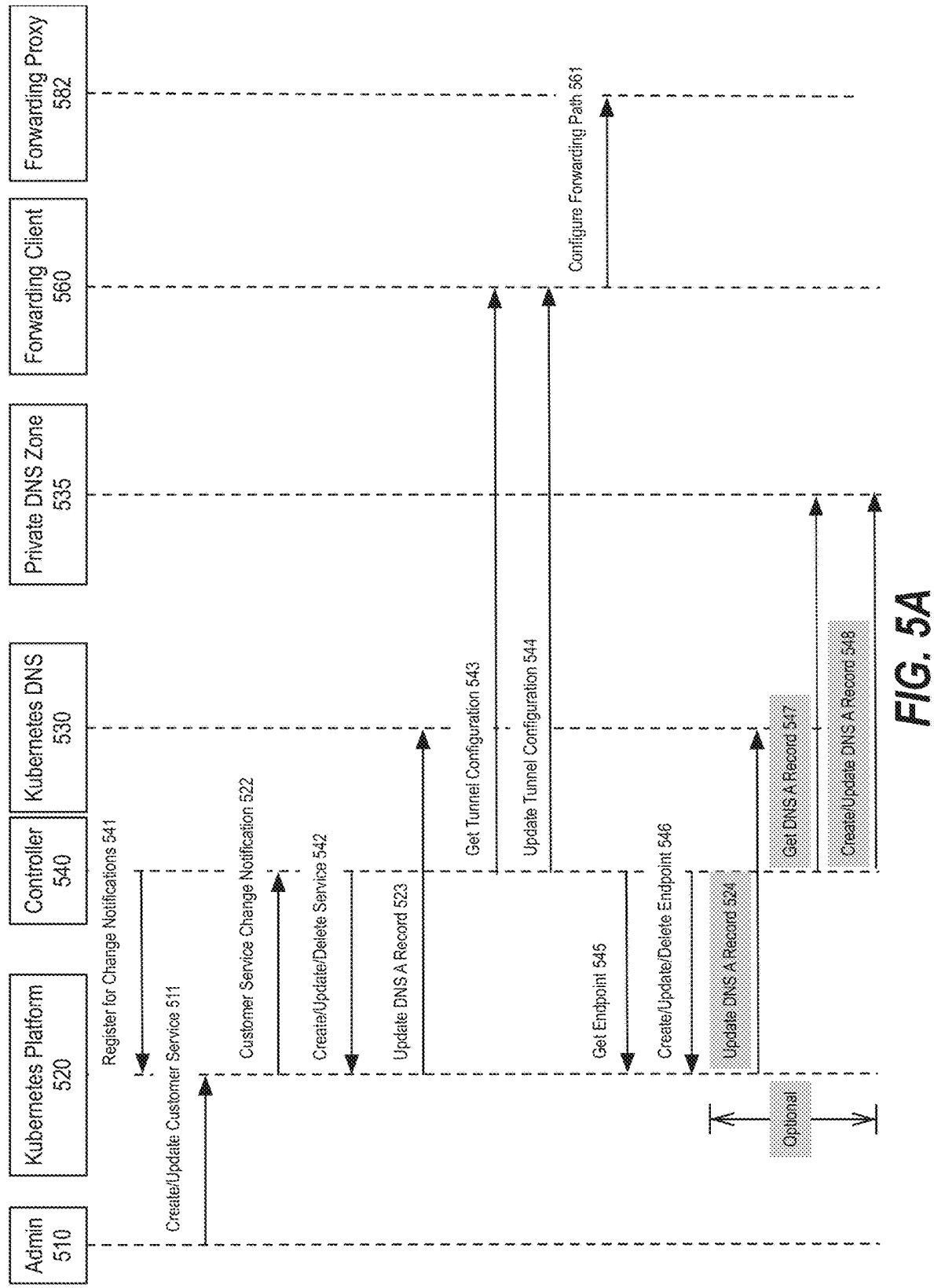
FIGS. 5A-B are interaction diagrams illustrating customer service and customer gateway update processing in accordance with an embodiment.

FIG. 5A is an interaction diagram illustrating customer service update processing in accordance with an embodiment. In the context of the present example, a procedure for configuring the above data mappings is illustrated in the form of an interaction diagram showing interactions among admin 510, Kubernetes platform 520, controller 540, Kubernetes DNS 530, private DNS zone 535, forwarding client 560 and forwarding proxy 582. In one embodiment, the admin 510 may represent any system that calls the Kubernetes platform 520 (e.g., the Kubernetes API) to deploy a customer service and/or a customer gateway (e.g., by creating or updating the service resource definition 111 and/or the gateway resource definition 112).

In the context of the present example, the procedure responds to changes in a customer service. Initially, controller 540 registers for change notifications 541 with the Kubernetes platform 520 so as to receive notifications responsive to customer service changes and/or customer gateway changes. For example, the controller 540 may request to be informed regarding creation, update to and/or deletion of a customer service and/or a customer gateway.

After receipt by the Kubernetes platform 520 of a create/update customer service call 511 from the admin 510, the Kubernetes platform 520 informs the controller 540 of the change via customer service change notification 522. Responsive to the requested change, the controller 540, first checks for a corresponding local service. The local service (service resource) is then created, updated or deleted as appropriate to match the requested change in the customer service via a create/update/delete service call 542 to the Kubernetes platform 520. According to one embodiment local services are linked to customer services by an owner reference with block owner deletion set to true. This will cause Kubernetes to automatically delete the local service if the customer service is deleted.

Responsive to creation, updating or deletion of the resource, the Kubernetes platform 520 update the corresponding DNS A record as appropriate via the update DNS A record call 523 to the Kubernetes DNS 530.

Next, the controller 540 checks the configuration of the forwarding client for or forwarding paths relating to this customer service via the get tunnel configuration call 543. According to one embodiment, a case in which the customer service is being deleted or there is no corresponding customer gateway is treated as if there are no API endpoints listed. For example, the latter situation may arise as a result of forwarding paths having been removed by the tunnelling mechanism due to communication failures. It is also possible that the forwarding client 560 has failed or been restarted by autonomous Kubernetes controls, resulting in a new IP address for the pod, for example. Finally, it is also possible that the forwarding proxy 582 identity has changed.

According to one embodiment, if there are forwarding paths at the forwarding client 550 that relate to API endpoints that are not listed on the customer service or are not configured correctly, those forwarding paths are removed. If there are forwarding paths that do correspond to API endpoints on the customer service, those forwarding paths remain unchanged. If there are API endpoints listed that have no forwarding path a new forwarding path is added by the forwarding client 560 via the configure forwarding path call 561 to the forwarding proxy 582. It is possible the attempt to configure a forwarding path may fail, if so, it can be returned to later (as discussed further below). At this point, assuming any attempt to configure a forwarding path has been successful, the states of the forwarding paths may be added to the state of the service, including the ports that implement the respective forwarding paths.

Continuing with the present example, next, the configuration of the endpoints resource is checked via the get endpoint 545 call. The resource is created, updated or deleted to match the change in the customer service and any change in forwarding paths via the create/update delete endpoint call 546. In one embodiment, endpoints resources are linked to customer services by an owner reference with block owner deletion set to true. This will cause Kubernetes to automatically delete the endpoints resource if the customer service is deleted.

If the service is headless, then an optional step of updating the DNS A record for the services is performed via the update DNS A record call 524 to the Kubernetes DNS 530 by the Kubernetes platform 520. According to one embodiment, this extra (optional) call to the Kubernetes DNS 530 is performed to update the ports for the entries as the information for the entries becomes known.

In the context of the present example, next as an optional extension depending on whether a domain name is configured in the customer service, the configuration of the private DNS zone is checked via the get DNS A record call 547 by the controller 540 to the private DNS zone 535 and the entry is created, updated or deleted to match the change in the customer service and any change in the forwarding client via the create/update DNS A record call 548 from the controller to the private DNS zone 535.

According to one embodiment, if any step does not succeed, the notification can be queued to be raised again after a delay. This accounts for any temporary failures such as local communication issues, pods restarting, or internet connectivity issues.

Figure 5B:
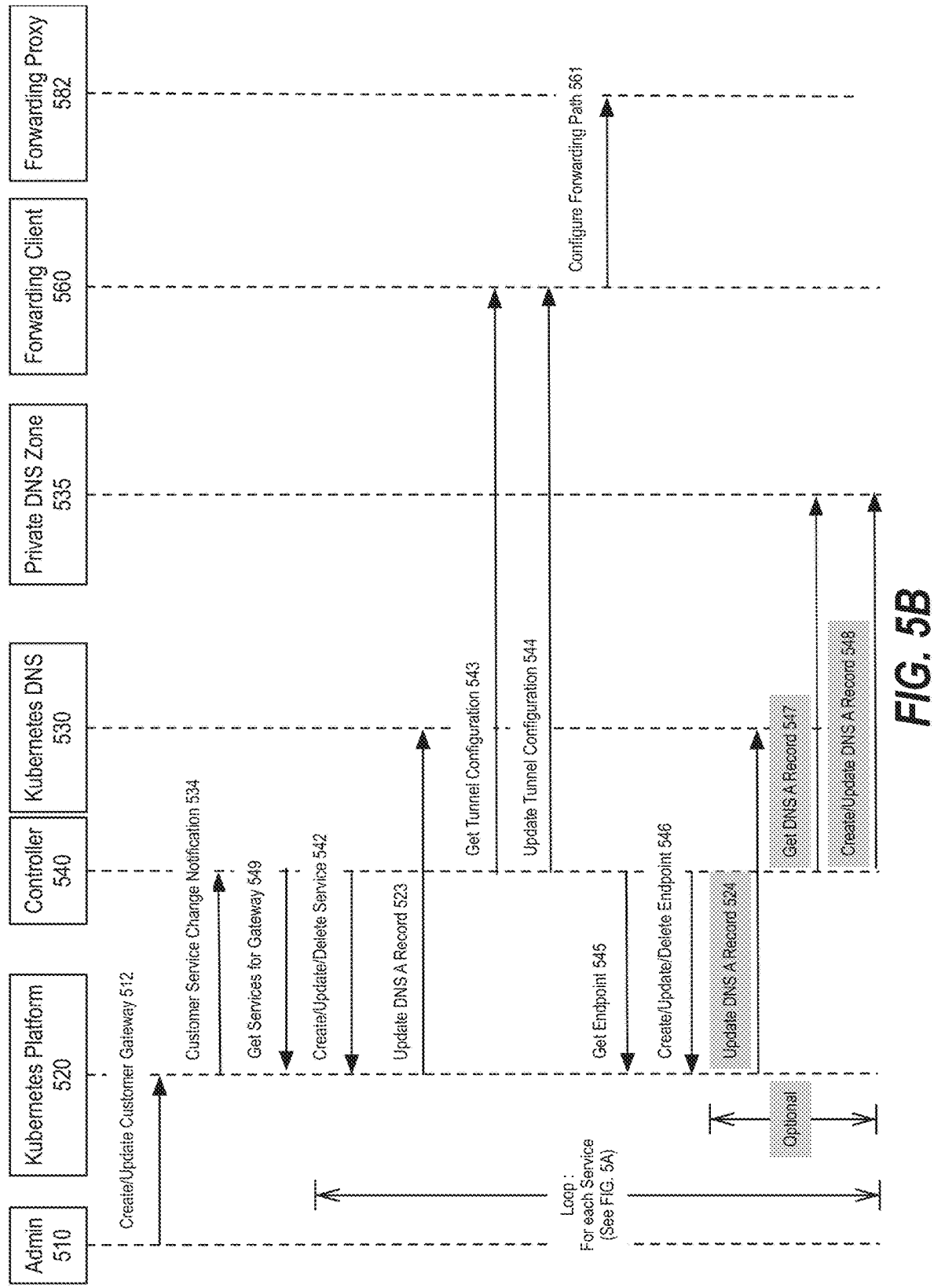

FIG. 5B is an interaction diagram illustrating customer gateway update processing in accordance with an embodiment. In the context of the present example, customer gateway changes are treated as customer service changes. According to one embodiment, responsive to receipt by the Kubernetes platform 520 of a create/update customer gateway call 512 from the admin 510, the Kubernetes platform 520 informs the controller 540 of the change via a gateway change notification 535. The controller 540 then fetches all the customer services related to the customer gateway via a get services for gateway call 549 to the Kubernetes platform 520 and processes each service as a customer service change as discussed above with reference to FIG. 5A.

Periodic Configuration Checks

It is possible that a failure or restart of any component, including the controller itself, can lead to the configuration of endpoints, DNS and forwarding paths to become inconsistent. As such, in one embodiment, consistency of the configuration is periodically checked to remediate any divergence that occurs. According to one embodiment, this can be done by scheduling customer service update notifications, which can then be processed as described above with reference to FIG. 5A.

Forward Path and DNS Name Leakage

If a customer service is removed, but some failure prevents forwarding paths or DNS entries being completely removed, there can be a resource leakage. To deal with this case, in one embodiment, a periodic check for any forwarding paths or DNS entries that do not relate to an existing customer service is performed, and if any are found, those unrelated forwarding paths or DNS entries are removed.

Applications

In embodiments described herein, when a customer gateway and customer service are deployed in an application platform (e.g., a Kubernetes cluster), an application running in the application platform will be able to use the remote endpoints by referring to the DNS name of the corresponding service and the same port as defined on the endpoint. For example, the following curl command would work if executed in the application platform:

>curl https://my-service:443

If the customer service has been configured with a domain name, in accordance with various embodiments described herein, the above command will successfully authenticate the API endpoint if the customer service? has the domain name in its server certificate.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 6:
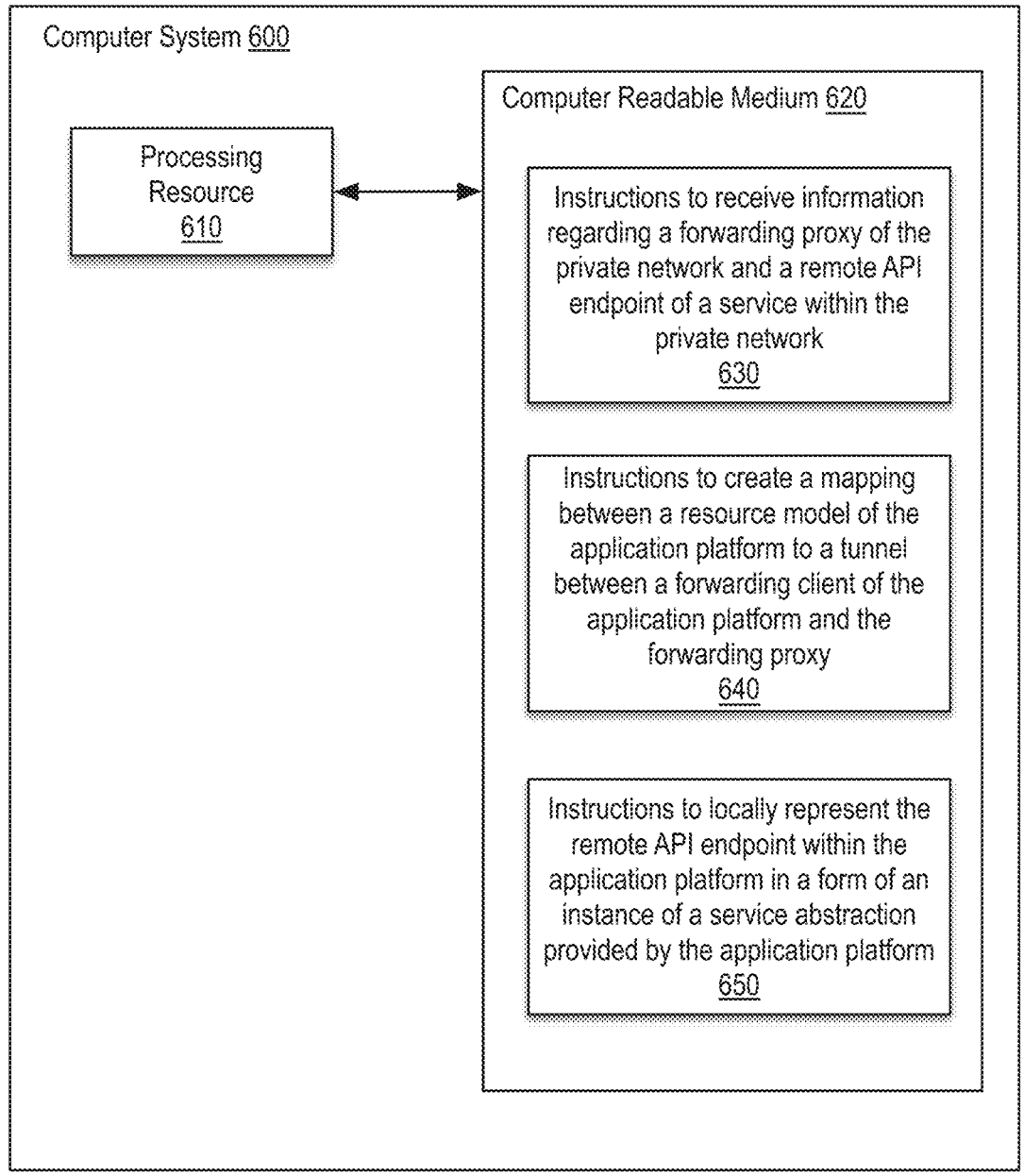
FIG. 6 is a block diagram of a computer system in accordance with an embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform a proactive auto-scaling method in accordance with a private cloud embodiment. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-650. It should be understood that part or all of the executable instructions and/or electronic circuits included within one block may, in alternate implementations, be included in a different block shown in the figures or in a different block not shown.

Instructions 630, upon execution, cause the processing resource 610 to receive information regarding a forwarding proxy of the private network and a remote API endpoint of a customer service within the private network that is to be represented locally within the application platform. In one embodiment, instructions 630 may correspond generally to instructions for performing block 210 of FIG. 2.

Instructions 640, upon execution, cause the processing resource 610 to create a mapping between a resource model of the application platform to a tunnel between a forwarding client of the application platform and the forwarding proxy. In one embodiment, instructions 640 may correspond generally to instructions for performing block 220 of FIG. 2.

Instructions 650, upon execution, cause the processing resource 610 to locally represent the remote API endpoint within the application platform in a form of an instance of a service abstraction provided by the application platform. In one embodiment, instructions 650 may correspond generally to instructions for performing block 230 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
receiving, by a processor, information regarding a forwarding proxy associated with a private network and information regarding a remote application programming interface (API) endpoint within the private network;
causing, by the processor, a forwarding client to instantiate a first port corresponding to a forwarding route for the remote API endpoint based on the received information regarding the forwarding proxy and the received information regarding the remote API endpoint; and
generating, by the processor, an instance of a service abstraction to represent the remote API endpoint within an application platform based on the first port of the forwarding client.

2. The computer-implemented method of claim 1, further comprising:
generating a mapping between a resource model of the application platform to a tunnel established between the forwarding client and the forwarding proxy.

3. The computer-implemented method of claim 1, further comprising:
configuring an instance of an endpoint abstraction provided by the application platform that maps a name and a second port of the remote API endpoint to an address and the first port of the forwarding client.

4. The computer-implemented method of claim 3, further comprising:
configuring endpoint attributes of the instance of the service abstraction with a protocol of the remote API endpoint and a reference to the instance of the endpoint abstraction.

5. The computer-implemented method of claim 1, wherein the information regarding the remote API endpoint comprises a domain name in a domain of the private network.

6. The computer-implemented method of claim 1, wherein when the instance of the service abstraction has a cluster Internet Protocol (IP) address, then a corresponding Domain Name System (DNS) entry associates the cluster IP address with a name in the corresponding DNS entry.

7. The computer-implemented method of claim 6, wherein when the instance of the service abstraction comprises a headless service, then the corresponding DNS entry associates an address and the first port of the forwarding client with a name in the corresponding DNS entry.

8. The computer-implemented method of claim 1, wherein the information regarding the forwarding proxy comprises a universal unique identifier (UUID).

9. A non-transitory machine readable medium storing instructions executable by a processing resource, the instructions executable to:
receive information regarding a forwarding proxy associated with a private network and information regarding a remote application programming interface (API) endpoint within the private network;

cause a forwarding client to instantiate a first port corresponding to a forwarding route for the remote API endpoint based on the received information regarding the forwarding proxy and the received information regarding the remote API endpoint; and generate an instance of a service abstraction to represent the remote API endpoint within an application platform based on the first port of the forwarding client.

10. The non-transitory machine readable medium of claim 9, the instructions executable to:

generate a mapping between a resource model of the application platform to a tunnel established between the forwarding client and the forwarding proxy.

11. The non-transitory machine readable medium of claim 9, the instructions executable to:

configure an instance of an endpoint abstraction provided by the application platform that maps a name and a second port of the remote API endpoint to an address and the first port of the forwarding client.

12. The non-transitory machine readable medium of claim 11, the instructions executable to:

configure endpoint attributes of the instance of the service abstraction with a protocol of the remote API endpoint and a reference to the instance of the endpoint abstraction.

13. The non-transitory machine readable medium of claim 9, wherein the information regarding the remote API endpoint comprises a domain name in a domain of the private network.

14. The non-transitory machine readable medium of claim 9, wherein when the instance of the service abstraction has a cluster Internet Protocol (IP) address, then a corresponding Domain Name System (DNS) entry associates the cluster IP address with a name in the corresponding DNS entry.

15. A system comprising:
a processing resource; and
a non-transitory computer-readable medium, coupled to the processing resource, having stored therein instructions executable by the processing resource, the instructions executable to:
receive information regarding a forwarding proxy associated with a private network and information regarding a remote application programming interface (API) endpoint within the private network;
cause a forwarding client to instantiate a first port corresponding to a forwarding route for the remote API endpoint based on the received information regarding the forwarding proxy and the received information regarding the remote API endpoint; and
generate an instance of a service abstraction to represent the remote API endpoint within an application platform based on the first port of the forwarding client.

16. The system of claim 15, the instructions executable to:
generate a mapping between a resource model of the application platform to a tunnel established between the forwarding client and the forwarding proxy.

17. The system of claim 15, the instructions executable to:
configure an instance of an endpoint abstraction provided by the application platform that maps a name and a second port of the remote API endpoint to an address and the first port of the forwarding client.

18. The system of claim 17, the instructions executable to:
configure endpoint attributes of the instance of the service abstraction with a protocol of the remote API endpoint and a reference to the instance of the endpoint abstraction.

19. The system of claim 15, wherein the information regarding the remote API endpoint comprises a domain name in a domain of the private network.

20. The system of claim 15, wherein the information regarding the forwarding proxy comprises a universal unique identifier (UUID).

* * * * *